United States Patent [19]
Burgess et al.

[11] Patent Number: 5,996,867
[45] Date of Patent: Dec. 7, 1999

[54] AIR DEFLECTIVE SHIELD

[76] Inventors: Fred R. Burgess; John Williams, Jr., both of 271 Righters Ferry Rd., Bala Cynwyd, Pa. 19004

[21] Appl. No.: 09/001,428

[22] Filed: Dec. 31, 1997

[51] Int. Cl.6 ...................................................... B60R 9/05
[52] U.S. Cl. ............................................. 224/316; 296/98
[58] Field of Search ............................. 296/98; 224/315, 224/316, 328

[56] References Cited

U.S. PATENT DOCUMENTS

| | | | |
|---|---|---|---|
| 4,174,134 | 11/1979 | Mathis | 296/136 |
| 4,480,869 | 11/1984 | Splithoff | 296/217 |
| 5,423,588 | 6/1995 | Eglinton | 224/328 |
| 5,553,760 | 9/1996 | Wright et al. | 224/316 |

FOREIGN PATENT DOCUMENTS

| | | | |
|---|---|---|---|
| 1073614 | 9/1954 | France | 224/328 |
| 3017358 | 12/1981 | Germany | 224/316 |
| 2184070 | 6/1987 | United Kingdom | 224/328 |

*Primary Examiner*—Dennis H. Pedder

[57] ABSTRACT

An air deflecting cargo shield is provided including a vehicle with a roof. The roof has a mounting mechanism for carrying a load such a ladder. A shield is mounted to a front extent of the roof of the vehicle. A retractable canvas assembly is situated adjacent to a top of the shield.

9 Claims, 2 Drawing Sheets

AIR DEFLECTIVE SHIELD

BACKGROUND OF THE INVENTION

1. Field of the Invention

The present invention relates to truck air shields and more particularly pertains to a new air deflective shield for precluding vehicular air resistance incurred by a load and further protecting the same while traveling.

2. Description of the Prior Art

The use of truck air shields is known in the prior art. More specifically, truck air shields heretofore devised and utilized are known to consist basically of familiar, expected and obvious structural configurations, notwithstanding the myriad of designs encompassed by the crowded prior art which have been developed for the fulfillment of countless objectives and requirements.

Known prior art truck air shields include U. S. Pat. Nos. 5,018,782; 4,934,754; 4,245,862; 4,492,406; 4,290,639; and U.S. Pat. Des. 254,063.

In these respects, the air deflective shield according to the present invention substantially departs from the conventional concepts and designs of the prior art, and in so doing provides an apparatus primarily developed for the purpose of precluding air resistance incurred by a load and further protecting the same while traveling.

SUMMARY OF THE INVENTION

In view of the foregoing disadvantages inherent in the known types of truck air shields now present in the prior art, the present invention provides a new air deflective shield construction wherein the same can be utilized for precluding air resistance incurred by a load and further protecting the same while traveling.

The general purpose of the present invention, which will be described subsequently in greater detail, is to provide a new air deflective shield apparatus and method which has many of the advantages of the truck air shields mentioned heretofore and many novel features that result in a new air deflective shield which is not anticipated, rendered obvious, suggested, or even implied by any of the prior art truck air shields, either alone or in any combination thereof.

To attain this, the present invention generally comprises a roof having a mounting mechanism for carrying a load. Such load preferably takes the form of a ladder. Next provided is a transparent shield including a horizontally oriented planar top face with a rectangular configuration. The shield further has a front face defined by a portion of a horizontally oriented hollow cylinder and a pair of vertically oriented planar side faces each integrally coupled to a respective side of the top face and the front face and depending downwardly therefrom. The faces thus define a bottom peripheral edge, an open rear encompassed by a rear peripheral edge and an interior space. As shown in FIG. 1, the bottom peripheral edge has an inwardly extending lip formed about an entire extent thereof with a plurality of spaced apertures formed therein. Such apertures are adapted for allowing the coupling of the shield to a front extent of the roof of the vehicle. Preferably, the cargo is situated at least partially within the interior space of the shield during use. A retractable canvas assembly is provided including a horizontally oriented spring loaded spool rotatably mounted between the side faces of the shield. In the preferred embodiment, the spool is situated adjacent to both the open rear and the top face thereof. An elongated flexible canvas sheet has a width equal to that of the shield and a length equal to that of the roof of the vehicle. The elongated canvas sheet has a pair of elongated side edges and a pair of short end edges. One of the short end edges is coupled to the spool and another one of the end edges includes a rigid rod coupled along a length thereof. A gripping assembly is mounted to a central extent of the rigid rod. The gripping assembly is equipped with an arcuate lip extending upwardly therefrom for gripping purposes. Further provided is a locking mechanism also situated at a central extent of the rigid rod. The locking mechanism includes a pair of apertures formed on a bottom face thereof. A U-shaped couple has a pair of ends adapted for being removably situated within the apertures of the locking mechanism. A key lock is included for selectively precluding the removal of the U-shaped couple from the locking mechanism. This permits a user to extend the canvas sheet and couple the same to a rear extent of the roof of the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new air deflective shield apparatus and method which has many of the advantages of the truck air shields mentioned heretofore and many novel features that result in a new air deflective shield which is not anticipated, rendered obvious, suggested, or even implied by any of the prior art truck air shields, either alone or in any combination thereof.

It is another object of the present invention to provide a new air deflective shield which may be easily and efficiently manufactured and marketed.

It is a further object of the present invention to provide a new air deflective shield which is of a durable and reliable construction.

An even further object of the present invention is to provide a new air deflective shield which is susceptible of a low cost of manufacture with regard to both materials and labor, and which accordingly is then susceptible of low prices of sale to the consuming public, thereby making such air deflective shield economically available to the buying public.

Still yet another object of the present invention is to provide a new air deflective shield which provides in the apparatuses and methods of the prior art some of the advantages thereof, while simultaneously overcoming some of the disadvantages normally associated therewith.

Still another object of the present invention is to provide a new air deflective shield for precluding air resistance incurred by a load and further protecting the same while traveling.

Even still another object of the present invention is to provide a new air deflective shield that includes a vehicle with a roof. The roof has a mounting mechanism for carrying a load such a ladder. A shield is mounted to a front extent of the roof of the vehicle. A retractable flexible canvas assembly is situated adjacent to a top of the shield.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
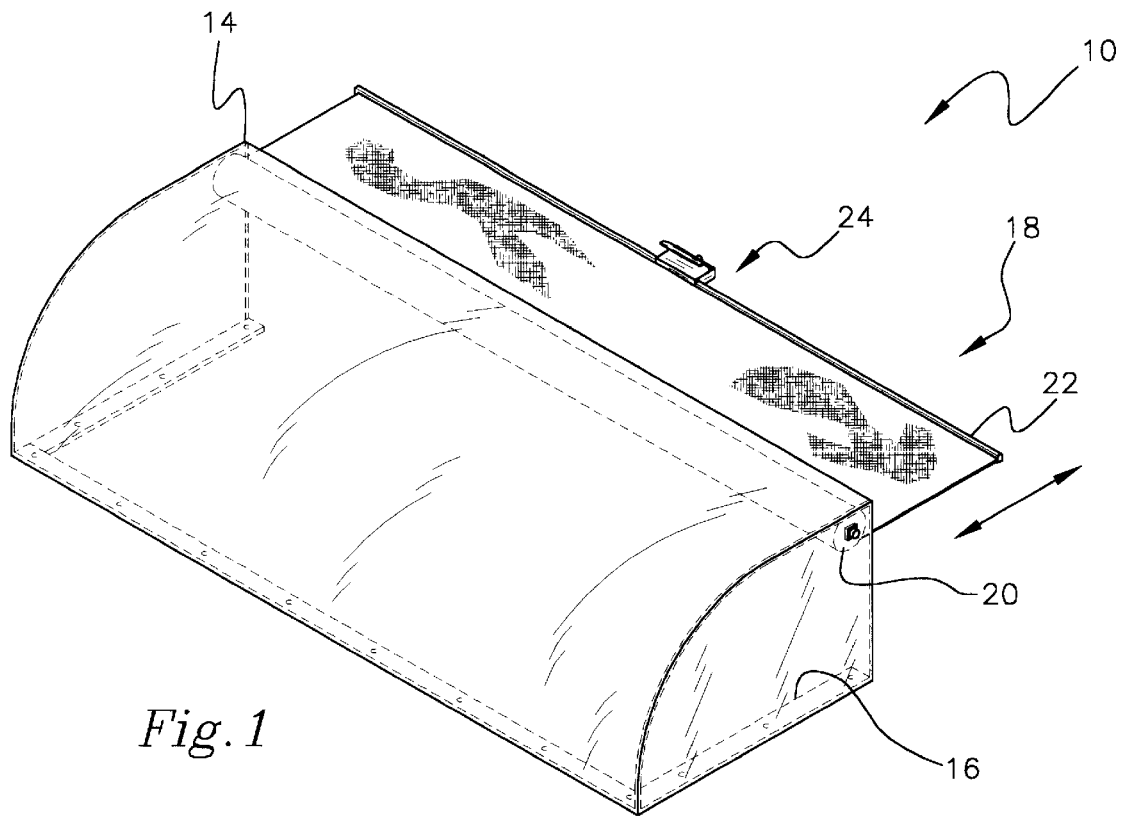
FIG. 1 is a front perspective view of a new air deflective shield according to the present invention.
Figure 2:
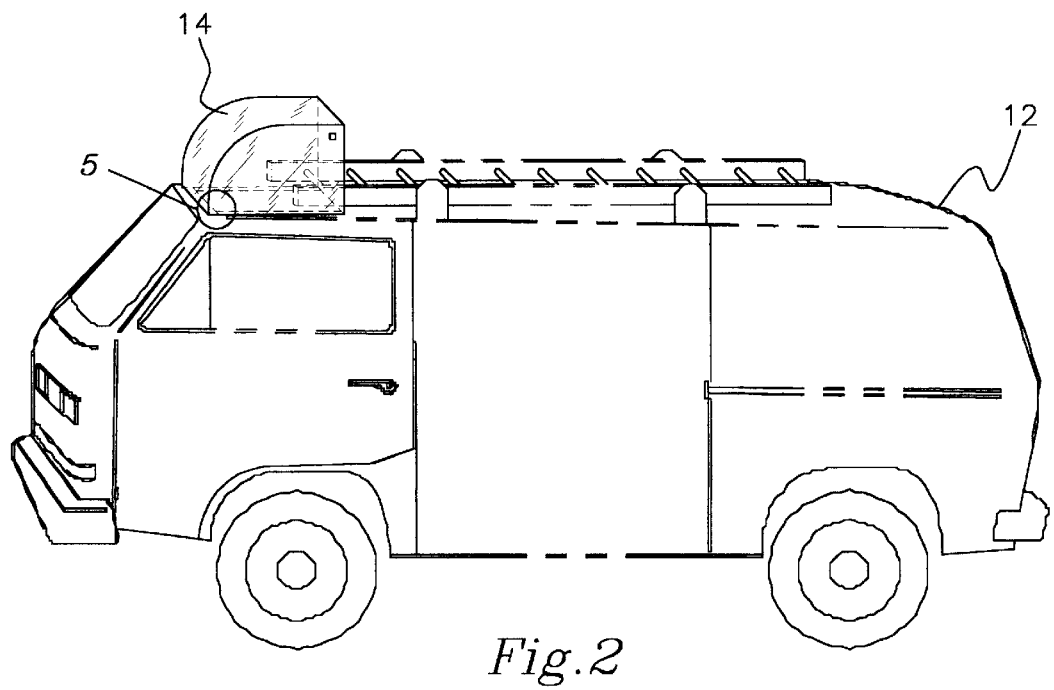
FIG. 2 is a side perspective view of the present invention in use.

With reference now to the drawings, and in particular to FIGS. 1 through 5 thereof, a new air deflective shield embodying the principles and concepts of the present invention and generally designated by the reference numeral 10 will be described.

The system 10 of the present invention includes a vehicle 12 with a roof having a mounting mechanism for carrying a load. Such load preferably takes the form of a ladder. In the alternative, the load may further include a tire, skis or the like.

Figure 3:
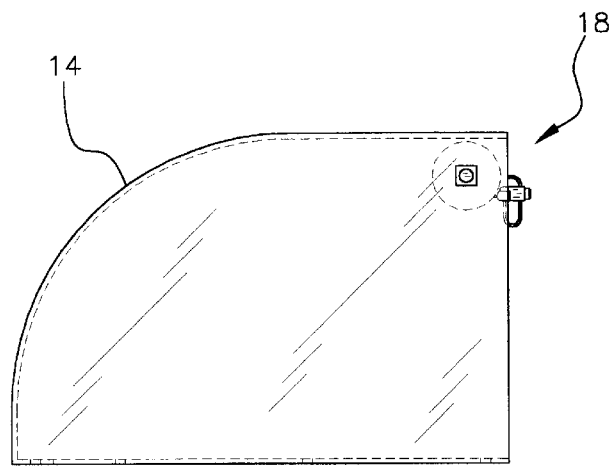
FIG. 3 is a side view of the present invention.
Figure 4:
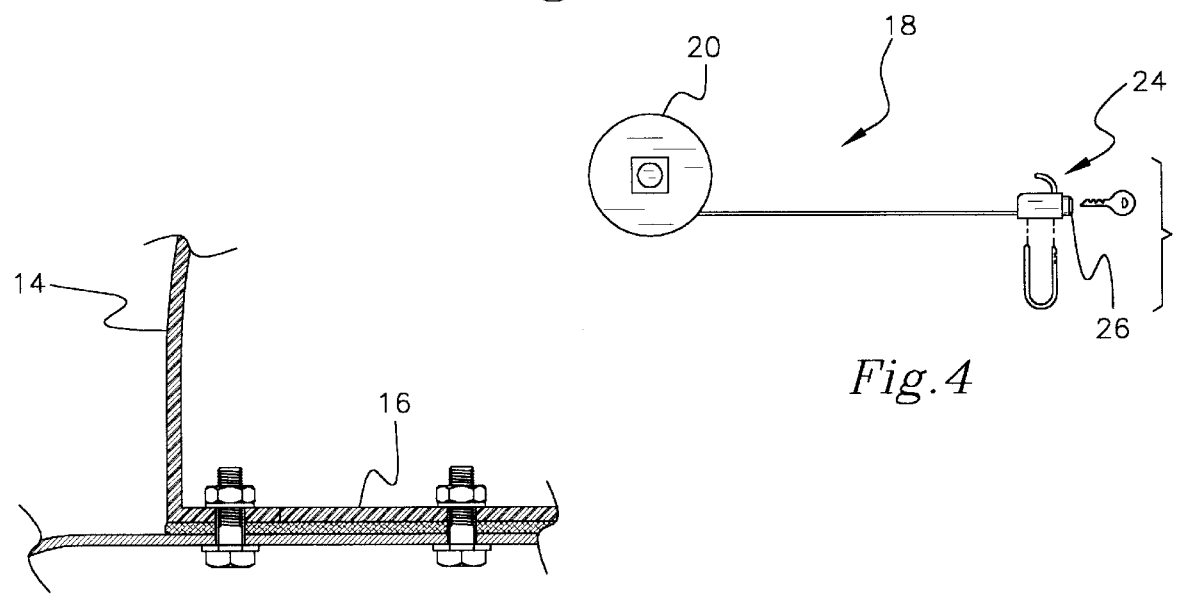
FIG. 4 is a side view of the canvas assembly of the present invention.

Next provided is a transparent shield 14 including a horizontally oriented planar top face with a rectangular configuration. The shield further has a front face defined by a portion of a horizontally oriented hollow cylinder and a pair of vertically oriented planar side faces each integrally coupled to a respective side of the top face and the front face and depending downwardly therefrom. As shown in FIG. 3, the side faces have a linear short top edge, an arcuate front edge and an elongated linear bottom edge. Together, the faces thus define a bottom peripheral edge, an open rear encompassed by a rear peripheral edge and an interior space. In the preferred embodiment, a width of the shield is equal to that of the vehicle.

Figure 5:
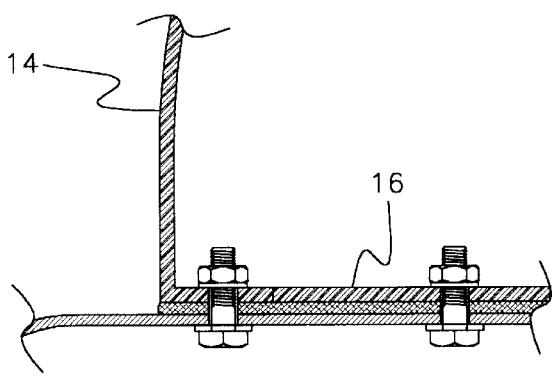
FIG. 5 is a close-up cross-sectional view of the present invention shown in FIG. 2.

As shown in FIG. 1, the bottom peripheral edge has an inwardly extending lip 16 formed about an entire extent thereof with a plurality of spaced apertures formed therein. Such apertures are adapted for allowing the coupling of the shield to a front extent of the roof of the vehicle by way of bolts. As shown in FIG. 5, an elastomeric bushing is situated between the shield and the vehicle roof for protection purposes. Preferably, the cargo is situated at least partially within the interior space of the shield during use.

A retractable canvas assembly 18 is provided including a horizontally oriented spring loaded spool 20 rotatably mounted between the side faces of the shield. In the preferred embodiment, the spool is situated adjacent to both the open rear and the top face of the shield. Included as a component of the retractable canvas assembly is an elongated flexible canvas sheet having a width equal to that of the shield and a length equal to that of the roof of the vehicle. The elongated canvas sheet has a pair of elongated side edges and a pair of short end edges. One of the short end edges is coupled to the spool and another one of the end edges includes a rigid rod 22 coupled along a length thereof.

A gripping assembly 24 is mounted to a central extent of the rigid rod. The gripping assembly is equipped with an arcuate lip extending upwardly therefrom and further forwardly for gripping purposes. Further provided is a locking mechanism 26 also situated at a central extent of the rigid rod. The locking mechanism includes a pair of apertures formed on a bottom face thereof. A U-shaped couple has a pair of ends adapted for being removably situated within the apertures of the locking mechanism. A key lock is included for selectively precluding the removal of the U-shaped couple from the locking mechanism. This permits a user to extend the canvas sheet and couple the same to a rear extent of the roof of the vehicle. Preferably, a key hole associated with the locking mechanism faces rearwardly for allowing convenient access thereto.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An air deflecting cargo shield comprising, in combination:

a vehicle with a roof having a mounting mechanism for carrying a load including a ladder;

a transparent shield including a horizontally oriented planar top face with a rectangular configuration, a front face defined by a portion of a horizontally oriented hollow cylinder and a pair of vertically oriented planar side faces each integrally coupled to a respective side of the top face and the front face and depending downwardly therefrom, the faces thus defining a bottom peripheral edge, an open rear encompassed by a rear peripheral edge and an interior space, the bottom peripheral edge defining an open bottom of the shield in communication with the interior space of the shield, the bottom peripheral edge having an inwardly extending lip formed about an entire extent thereof with a plurality of spaced apertures formed therein for allowing the coupling of the same with a front extent of the roof of the vehicle, the open bottom of the shield facing downwards towards the roof of the vehicle, wherein the cargo is situated at least partially within the interior space of the shield, the top face of the shield extending between the front face and the open rear of the shield, the top face of the shield lying in a plane parallel with a plane in which the bottom peripheral edge lies; and a retractable canvas assembly being disposed in the interior space of the shield, the retractable canvas assembly including a horizontally oriented spring loaded spool rotatably mounted to the shield in the interior spaced the shield between the side faces of the shield adjacent to both the open rear and the top face thereof, an elongated flexible canvas sheet having a width equal to that of the shield the elongated canvas sheet having a pair of elongated side edges and a pair of short end edges, one of the short end edges being coupled to the spool and another one of the end edges including a rigid rod coupled along a length thereof, a gripping assembly mounted to a central extent of the rigid rod with an arcuate lip extending upwardly therefrom for gripping purposes, and a locking mechanism also situated at a central extent of the rigid rod, the arcuate lip of the gripping assembly having a forwardly facing concavity facing in a direction towards the front face of the shield, the gripping assembly being generally rectangular and having a width defined parallel to the adjacent short end edge of the canvas sheet, the width of the gripping assembly being several times less than that of the canvas sheet, the locking mechanism including a pair of apertures formed on a bottom face thereof, a U-shaped couple having a pair of ends adapted for being removably situated within the apertures of the locking mechanism, and a key lock for selectively precluding the removal of the U-shaped couple from the locking mechanism for allowing a user to extend the canvas sheet and couple the same to a rear extent of the roof of the vehicle.

2. An air deflecting cargo shield comprising:

a vehicle with a roof having a mounting mechanism for carrying a load;

a shield mounted to a front extent of the roof of the vehicle;

a retractable canvas assembly mounted to the shield;

the shield having an arcuate front face and a pair of side faces to define a hollow interior;

the canvas assembly includes a spring loaded spool which is coupled between the side faces within the interior space of the shield;

the shield further including a top face and a bottom peripheral edge defining an open bottom of the shield in communication with the interior space of the shield, the top face of the shield extending between the front face and the open rear of the shield, the top face of the shield lying in a plane parallel with a plane in which the bottom peripheral edge lies.

3. An air deflecting cargo shield as set forth in claim 2 wherein the canvas assembly includes a spring loaded spool.

4. An air deflecting cargo shield as set forth in claim 2 wherein the shield is transparent.

5. An air deflecting cargo shield as set forth in claim 2 wherein the canvas assembly includes a flexible canvas sheet with a width equal to that of the shield.

6. An air deflecting cargo shield as set forth in claim 2 wherein the canvas assembly has an elongated canvas sheet including a pair of elongated side edges and a pair of short end edges, one of the short end edges being coupled to a spool and another one of the end edges including a rigid rod coupled along a length thereof.

7. An air deflecting cargo shield as set forth in claim 2 wherein the canvas assembly has a gripping assembly for gripping purposes, the gripping assembly having an arcuate lip extending upwardly therefrom for gripping purposes, the arcuate lip of having a forwardly facing concavity.

8. An air deflecting cargo shield as set forth in claim 2 wherein the canvas assembly has a canvas sheet with a locking mechanism situated thereon for allowing a user to extend the canvas sheet and secure the extended sheet.

9. An air deflecting cargo shield as set forth in claim 8 wherein the locking mechanism includes a pair of apertures formed on a bottom face thereof, a U-shaped couple having a pair of ends adapted for being removably situated within the apertures of the locking mechanism, and a key lock for selectively precluding the removal of the U-shaped couple from the locking mechanism for allowing the user to extend the canvas sheet and secure the extended sheet.

* * * * *